United States Patent [19]
Enomoto et al.

[11] Patent Number: 5,933,183
[45] Date of Patent: Aug. 3, 1999

[54] COLOR SPATIAL LIGHT MODULATOR AND COLOR PRINTER USING THE SAME

[75] Inventors: Jun Enomoto; Hiroaki Nakamura, both of Kanagawa, Japan

[73] Assignee: Fuji Photo Film Co., Ltd., Kanagawa, Japan

[21] Appl. No.: 08/763,662

[22] Filed: Dec. 11, 1996

[30] Foreign Application Priority Data

Dec. 12, 1995 [JP] Japan ................................. 7-323310
Dec. 13, 1995 [JP] Japan ................................. 7-324656

[51] Int. Cl.⁶ ............................ H04N 1/40; G01D 9/42
[52] U.S. Cl. .................... 347/241; 347/239; 359/224; 359/292
[58] Field of Search .................... 347/239, 241; 359/223, 224, 292

[56] References Cited

U.S. PATENT DOCUMENTS

| | | | |
|---|---|---|---|
| 4,810,058 | 3/1989 | Sangyoji et al. | 349/2 |
| 4,875,057 | 10/1989 | Hediger et al. | 347/238 |
| 5,047,789 | 9/1991 | Kanayama et al. | 347/241 |
| 5,049,901 | 9/1991 | Gelbart | 347/239 |
| 5,721,622 | 2/1998 | Venkateswar | 358/298 |

OTHER PUBLICATIONS

N. Nishida: "Micro machines and optical techniques (2), Digital micromirror devices (DMD) and their applications to displays", O plus E (a magazine), Oct. 1994, No. 179, pp. 90–94.

G. Foley et al.: "S7–6 Recent Advances in Actuated Mirror Array (AMA) Projector Development"; Aura Syss., Inc. El Segundo, USA. Daewoo Elect., Seoul, Korea.

"Mirrors on a Chip"; IEEE Spectrum, Nov. 1993; pp. 27–31.

"Digital Micromirror Device Imaging Bar for Hardcopy"; Nelson et al.; Digital Imaging Venture Project Texas Instruments Inc., P.O. Box. 655474. M/S 440, Dallas Texas 75265–5474; SPIE vol. 2413; pp. 58–65.

"Micromirrors and Digital Processing"; Photonics Spectra; May 1995; pp. 118–124.

*Primary Examiner*—N. Le
*Assistant Examiner*—Lamson D. Nguyen
*Attorney, Agent, or Firm*—Sughrue, Mion, Zinn, Macpeak & Seas, PLLC

[57] ABSTRACT

A color spatial light modulator has red, green, and blue micromirror arrays juxtaposed in parallel. Each micromirror array has a number of micromirrors each formed with a filter for reflecting specific color light. As data "1" is written to a memory cell of an SRAM, the micromirror tilts by +θ and enters a valid reflection state in which spot light is utilized. As data "0" is written, the micromirror tilts by −θ and enters an invalid reflection state in which spot light is not utilized. A data write control circuit converts image data into mirror drive data and writes it to SRAM. Three-color parallel line light beams generated by the three-color micromirror arrays are projected by a projector lent onto color paper. A three-color image is printed line sequentially on the color paper.

17 Claims, 11 Drawing Sheets

FIG. 1
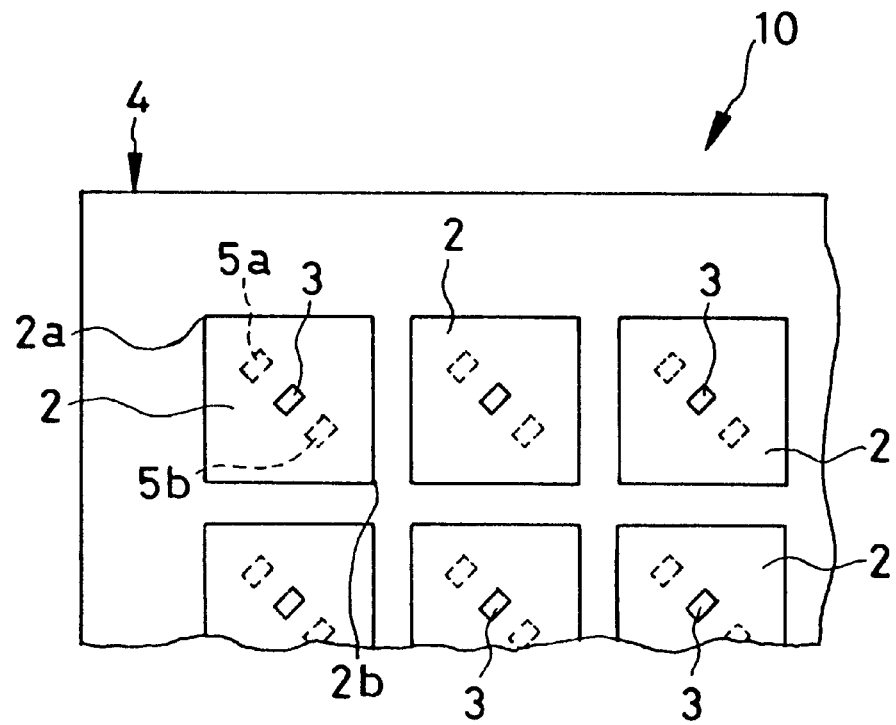
FIG. 2A  FIG. 2B  FIG. 2C
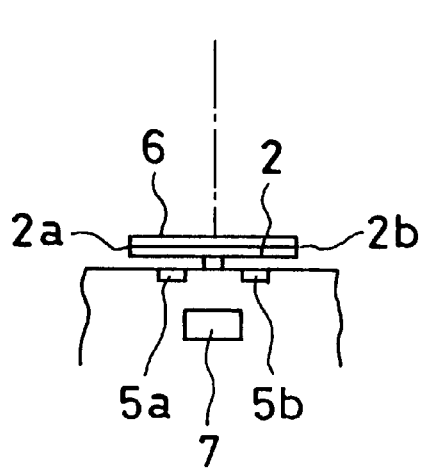 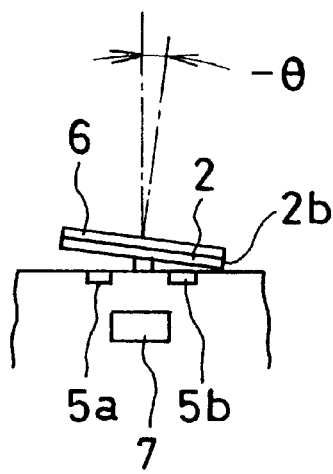 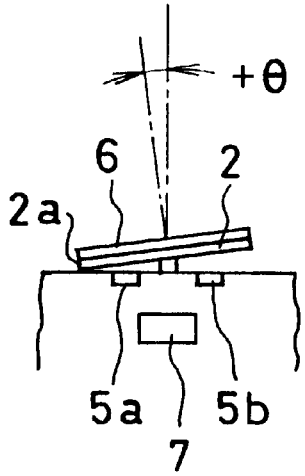

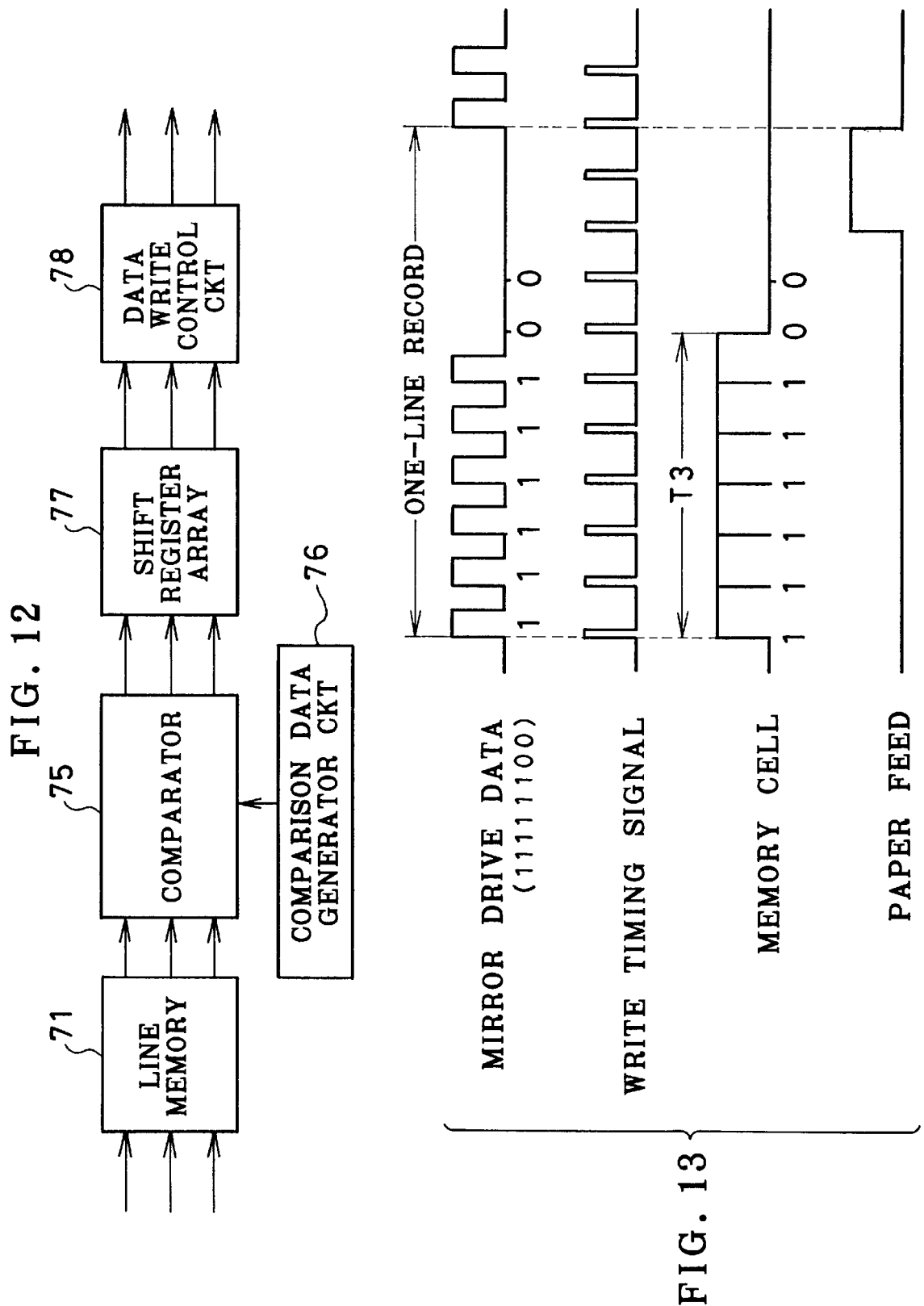

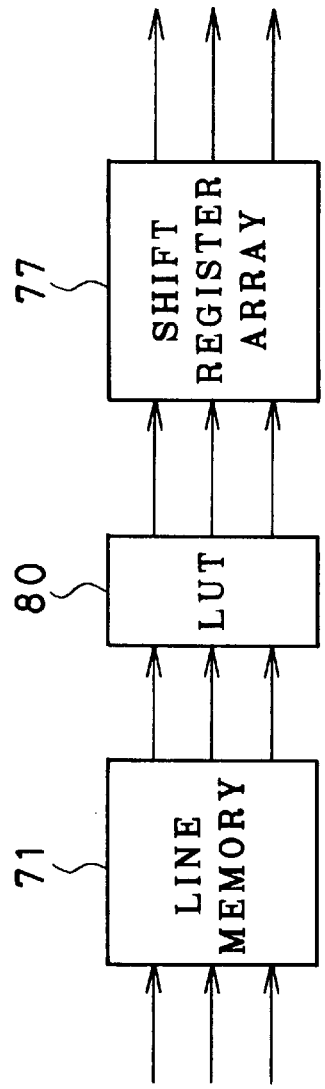
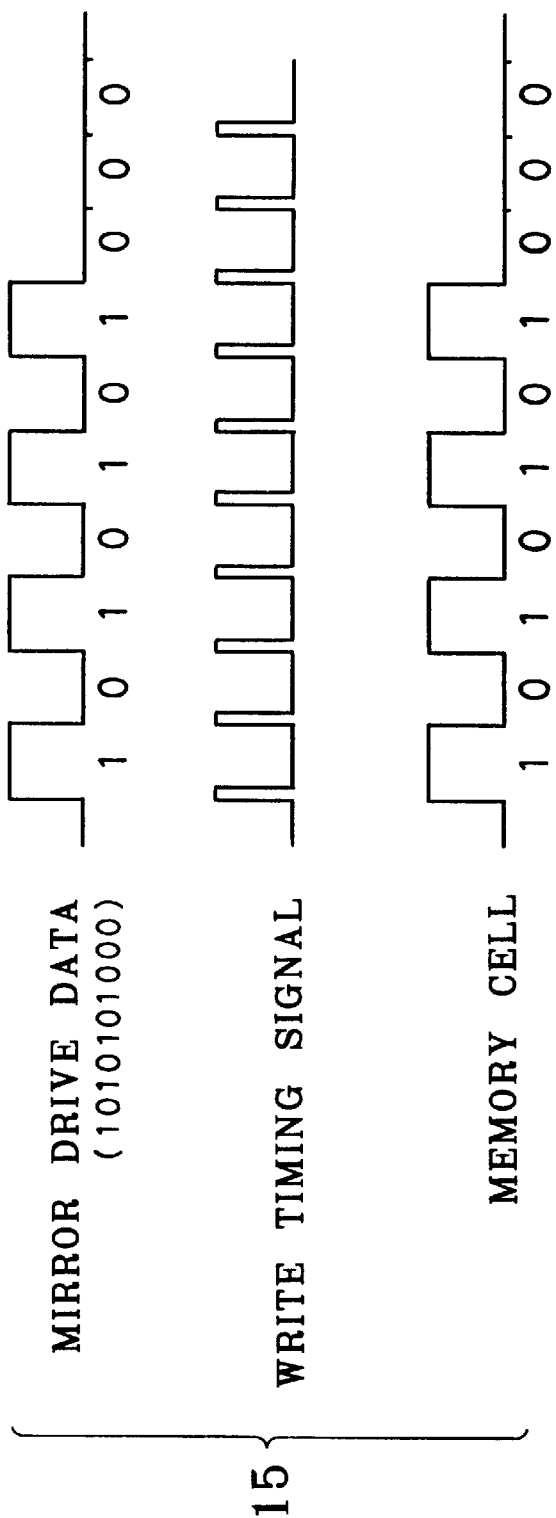

COLOR SPATIAL LIGHT MODULATOR AND COLOR PRINTER USING THE SAME

BACKGROUND OF THE INVENTION

1. Field of the Invention

The present invention relates to a color spatial light modulator and a color printer using the same. More particularly, the invention relates to a color spatial light modulator having small size mirrors disposed in a line or matrix, for each which the light reflection direction is variable for projecting a specific color spot light, and to a color printer using such a color spatial light modulator for image formation.

2. Description of the Related Art

A spatial light modulator has a function of deflecting a propagation direction of incident light, and so it is used, for example, as an on/off controller of a laser optical system for controlling propagation of a laser beam. Conventionally, an ultrasonic light modulator has been used which deflects a laser beam by ultrasonic wave. Recently, a mirror type spatial light modulator has been proposed which has a number of small size mirrors (hereinafter called micromirrors), the tilt angle of each micromirror being changed to control deflection. Mirror type spatial light modulators include digital micromirror devices (DMD) which tilt each micromirror by electrostatic force, piezo-electric type drive micromirror devices (AMA) which tilt each micromirror by mechanical deformation of a fine piezoelectric element, and the like.

For example, a digital micromirror device has a static RAM (SRAM) on each memory cell of which a micromirror capable of swinging is formed by semiconductor integration techniques. Mirror drive data of one bit, when written to each memory cell, tilts the micromirror in a positive direction or in a negative direction to change the light reflection direction. The principle and applications of such a digital micromirror device are described in a monthly magazine "O plus E", October, 1994, pp. 90–94.

As one of the applications, this document describes a sequential field type color video projector. In this color video projector, illumination light from a white light source passes through a color filter disk and enters a digital micromirror device. The color filter disk has three sectors of red, green, and blue filters. The digital micromirror device has a number of micromirrors disposed in matrix. As "1" is written to a memory cell, the micromirror tilts by an angle +θ from a horizontal plane, and as "0" is written, it tilts by an angle −θ.

If the red filter is set in front of the white light source, red image data of one frame is written to the digital micromirror device. As the red image data of "1" is stored in a memory cell, this micromirror reflects the red light transmitted through the red filter toward a projection lens, whereas as the red image data of "0" is stored, the micromirror tilts by the angle −θ and the red light is reflected toward a light absorption plate.

The digital micromirror device generates a number of red spot lights depending on the tilt angle of each micromirror disposed in matrix. One red light spot corresponds to one red pixel. A red image of one frame constituted of these red light spots is projected via a projector lens onto a screen. The grey scale of a red image changes with a time period during which the tilt angle takes +θ.

Next, green image data is written to the digital micromirror device, and thereafter the green filter is set in front of the white light source. A green image of one frame generated by the digital micromirror device is projected onto the screen. Thereafter, blue image data is written and a blue image of one frame is projected from the digital micromirror device onto the screen. While the color filter disk is rotated at high speed, image data of each color is written to the digital micromirror device synchronously with the timing of the setting of each color filter so that three color images are sequentially projected onto the screen at high speed and an image of full color synthesized on the screen can be observed.

A conventional mirror type spatial light modulator requires a rotatable color filter disk in order to display or record a color image. This color filter disk complicates the structure of a video projector and makes the projector bulky.

Known color printers for recording a color image on a photosensitive material include a CRT type, a laser type, a liquid crystal type, and the like. The CRT type color printer requires a large CRT and a complicated CRT driver circuit. The laser type color printer basically performs line exposure so that the intensity of a laser beam is modulated in the unit of pixel. This takes a long time for intensity modulation. Since an exposure time of one pixel is short, a reciprocity law failure of photosensitive material may occur. Compensation for this is very cumbersome. The liquid crystal type color printer requires a light source of high intensity because the transmittance of each pixel is small. Furthermore, since an aperture efficiency (vignetting factor) of each pixel is small, the image quality is not good.

The micromirror device has advantages of a low light attenuation coefficient and a large aperture efficiency. It is therefore advantageous if the micromirror device is utilized in a color printer. However this color printer using the micromirror device uses a rotatable color filter disk and the structure is made complicated.

SUMMARY OF THE INVENTION

It is a principal object of the present invention to provide a color spatial light modulator capable of dispensing with a rotatable color filter disk.

It is another object of the present invention to provide a compact color printer simple in structure.

In order to achieve the above and other objects, the color spatial light modulator of this invention has at least one micromirror array and a filter fixedly mounted in correspondence with each micromirror of the micromirror array. A dye filter, an interference filter, or the like is used. A dye filter is directly formed on a micromirror or on a transparent plate disposed above micromirrors. The dye filter converts white light into color light in a specific wavelength range, through absorption and transmission functions thereof. An interference filter is formed on each micromirror to reflect light in a specific wavelength range. Instead of a micromirror, a plate (microplate) without a mirror function may be used on which an interference filter is formed.

According to a preferred embodiment of the invention, the color spatial light modulator has at least first to third micromirror arrays extending in parallel. The first to third micromirror arrays are provided with red, green, and blue filters, respectively. A plurality of micromirror arrays with the same color filters may be juxtaposed.

According to another preferred embodiment of the invention, the color spatial light modulator has a plurality of micromirror arrays disposed in parallel, and micromirrors of the arrays are disposed in matrix. The same color filter is provided for each micromirror. According to still another preferred embodiment of the invention, red, green, and blue color filters are formed on micromirrors in a mosaic pattern.

A color printer of this invention has at least three micromirror arrays and red, green, and blue color filters fixedly disposed in correspondence with each micromirror array, and generates a red spot light of one line, green spot light of one line, and blue spot light of one line. Mirror drive means drives each micromirror array in accordance with corresponding red, blue, and green image data of one line. Three-color line light from the color spatial light modulator is projected onto photosensitive material by a projector optical system. The filter is directly formed on each micromirror or disposed on an input or output optical path of the micromirror. Instead of the filter, three color light sources for generating light of three primary colors may be used.

The color spatial light modulator of this invention uses a filter mounted on each micromirror or on a transparent plate of a package, for absorbing or reflecting color light in a specific wavelength range and allowing specific color light to travel. Therefore, a conventional rotary color filter plate is not necessary. Furthermore, a filter is formed on each micromirror or on a transparent plate for hermetically sealing a package. Therefore, manufacture is easy and manufacturing costs can be reduced.

The color printer of this invention uses a filter formed in correspondence with each micromirror for allowing travel of color light in a specific wavelength range. Therefore, a filter drive mechanism for inserting or retracting a three-color filter is not necessary. Therefore, the structure of the color printer can be simplified and made compact. If a filter switching mechanism is used, this switching speed is very slow as compared to a very fast displacement time of 20 $\mu$s of a micromirror so that print time becomes long. However, since the filter is not inserted or retracted in this invention, a print time is not increased.

BRIEF DESCRIPTION OF THE DRAWINGS

The above objects and advantages of the present invention will become apparent from the following detailed description of the preferred embodiments of the invention when read in conjunction with the accompanying drawings, in which:

FIG. 1 is a diagram illustrating a color spatial light modulator of this invention;

FIGS. 2A to 2C are diagrams illustrating the operation of a micromirror;

FIG. 12 is a block diagram showing an example of a data converter using a comparator;

FIG. 13 shows signal waveforms illustrating a one line record operation of the data converter shown in FIG. 12;

FIG. 14 is a block diagram showing an example of a data converter using an LUT;

FIG. 15 shows signal waveforms illustrating a one line record operation of the data converter shown in FIG. 14;

DETAILED DESCRIPTION OF THE PREFERRED EMBODIMENTS

Figure 3:
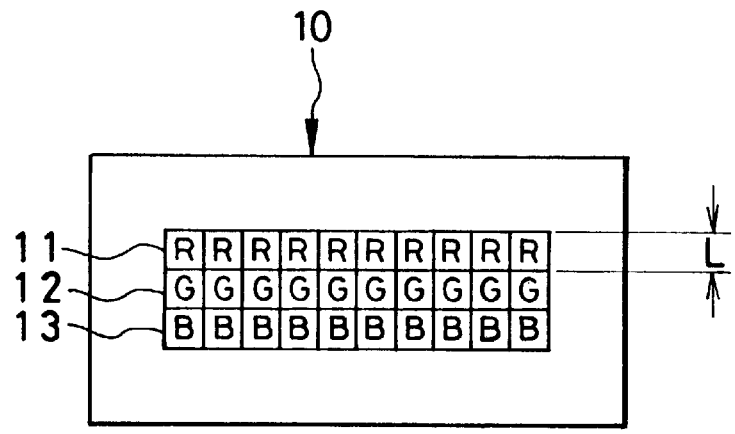
FIG. 3 is a diagram showing a color spatial light modulator having a single micromirror array for each color.

FIG. 1 briefly shows a color spatial light modulator of this invention. In the color spatial light modulator 10, a filter is directly formed on each micromirror of a digital micromirror device. A plurality of micromirrors 2 are disposed in matrix. Each micromirror 2 is supported and is capable of swinging above a static RAM (SRAM) 4 at a post 3 formed at the central area of the memory cell. Each micromirror 2 is a square having a side length of, for example, 16 $\mu$m, and is made of a metal thin film such as conductive aluminum.

Address electrodes 5a and 5b are formed on both sides of the post 3. The address electrodes 5a and 5b and the micromirror 2 constitute a capacitor. The micromirror 2 is tilted by static electricity charged between the address electrodes 5a and 5b and the micromirror 2. Specifically, one of the corners 2a and 2b on a diagonal line passing through the post 3 and address electrodes 5a and 5b tilts and contacts the silicon substrate on which SRAM 4 is formed. The corners on the other diagonal line are suspended by a pair of support posts via torsion hinges. Each constituent such as micromirror 2 and post 3 is fabricated by known transistor integration techniques.

As shown in FIGS. 2A to 2C, a filter 6 is formed on the surface of each micromirror 2, and transmits one of red, green, and blue light while absorbing light in specific wavelength ranges. Such filters are not shown in FIG. 1. Each filter 6 is formed on the mirror surface by vapor deposition, transfer, adhesion, or the like. The filter 6 may be an interference filter instead of using a dye filter. An interference filter reflects light in a specific wavelength range by utilizing light interference of a multi-layer thin film. Therefore, in place of the micromirror 2, a metal thin film having a low reflectivity may be formed as a microplate. Obviously, a light absorption film may be formed on the micromirror and an interference filter is formed on the light absorption film.

Each micromirror 2 is disposed above each memory cell 7 of SRAM 4. Each memory cell 7 is constituted of a flip-flop having at least two transistors. The transistors are connected to the address electrodes 5a and 5b. One transistor of the flip-flop in an active state is ON and the other is OFF. Therefore, one of the address electrodes is, for example, +5 V and the other is 0 V. The mirror drive data determines the electrode at +5 V.

If the power is OFF, the two transistors are OFF so that the address electrodes 5a and 5b are not applied with any voltage and the micromirror is not applied with a bias voltage. Therefore, the micromirror is horizontal as shown in FIG. 2A.

As mirror drive data "0" is written to the memory cell 7, the address electrode 5a has 0 V and the address electrode 5b has +5 V. As a negative bias is applied to the micromirror 2, the micromirror 2 tilts to the address electrode 5b side and its corner 2b contacts the silicon substrate, as shown in FIG. 2B.

As mirror drive data "1" is written to the memory cell 7, the address electrode 5a has +5 V and the address electrode 5b has 0 V. As a negative bias is applied to the micromirror 2, the micromirror 2 tilts to the address electrode 5a side and its corner 2a contacts the silicon substrate, as shown in FIG. 2C. The micromirror 7 tilts therefore by +θ or by −θ in accordance with the mirror drive data value.

The micromirror 2 has one horizontal state and two tilt states. The two tilt states are utilized for image formation. In one of the two tilt states, spot light travels from the micromirror 2 to form an image. For example, while the micromirror 2 takes +θ, spot light from the micromirror 2 is guided to an image forming optical path. While the micromirror 2 takes −θ, spot light is not needed so that it is guided to an eliminating optical path. While the micromirror 2 takes +θ, a valid reflection state (ON state) maintains in which reflection light is utilized for image formation. While the micromirror 2 takes −θ, an invalid reflection state (OFF state) maintains in which reflection light is not utilized for image formation. The tonal level of an image can be represented by changing the time or occurrence frequency of the valid reflection state of the micromirror 2.

FIG. 3 shows an example of a color spatial light modulator. The color spatial light modulator 10 has a red micromirror array 11, a green micromirror array 12, and a blue micromirror array 13, respectively disposed in parallel. Each micromirror array 11–13 has micromirrors which tilt by electrostatic force and are disposed in line at a predetermined pitch. Each micromirror array has 10 micromirrors in the drawing, but has a great number thereof in actuality. A predetermined distance L may be provided between adjacent micromirror arrays.

In the red micromirror array 11, a red filter indicated by R is formed on each micromirror. In the green micromirror array 12, a green filter indicated by G is formed on each micromirror. In the blue micromirror array 13, a blue filter indicated by B is formed on each micromirror. A micromirror array without filters may be added for forming a monochrome image, in addition to the color micromirror arrays 11 to 13. In a color printer using this color spatial light modulator, a photosensitive material such as color paper is intermittently fed by one line to perform line printing.

Figure 4:
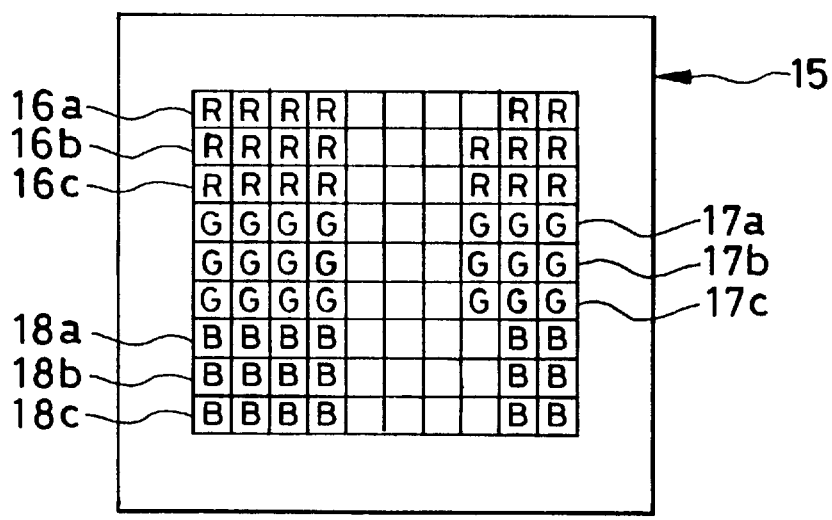
FIG. 4 is a diagram showing a color spatial light modulator having a plurality of micromirror arrays for each color.

FIG. 4 shows an example of a color spatial light modulator having a plurality of micromirror arrays for respective colors. The color spatial light modulator 15 has three rows of red micromirror arrays 16a to 16c, three rows of green micromirror arrays 17a to 17c, and three rows of blue micromirror arrays 18a to 18c. With this color spatial light modulator 15, the same color of three lines is recorded at the same time so that high speed printing is possible. In this case, color paper is intermittently fed by three lines. A distance of three lines may be provided between micromirror arrays of different colors.

Figure 5:
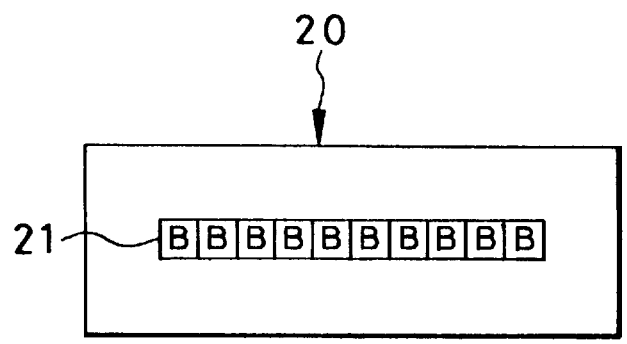
FIG. 5 is a diagram showing a blue spatial light modulator.

FIG. 5 shows an example of a blue spatial light modulator 20 having one blue micromirror array 21. The blue micromirror array 21 actually has a great number of micromirrors. For record or display of a full-color image, a red spatial light modulator, a green spatial light modulator, and a blue spatial light modulator are used in combination.

Figure 6:
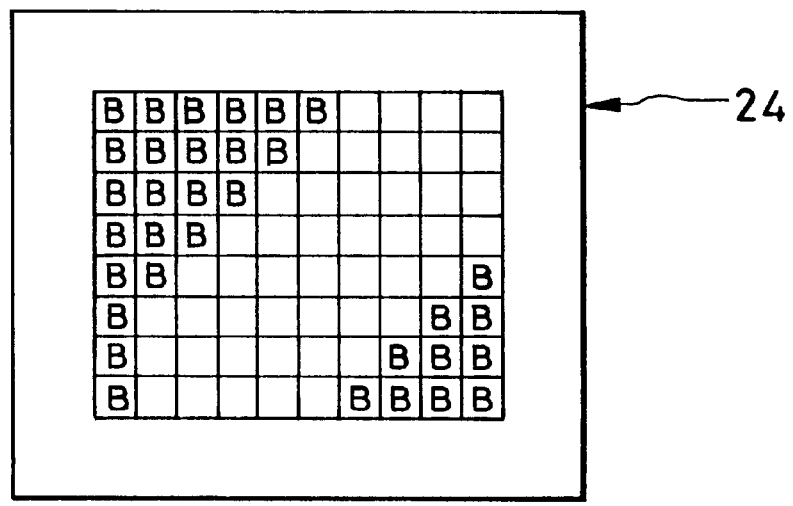
FIG. 6 is a diagram showing a color spatial light modulator having micromirrors disposed in matrix.

FIG. 6 shows an area type blue spatial light modulator 24 having a plurality of juxtaposed blue micromirror arrays. Each blue micromirror array has blue micromirrors with blue filters disposed in line. In this example, eight blue micromirror arrays are formed and blue micromirrors are disposed in matrix. This blue spatial light modulator 24 is used for printing or displaying a blue image of one frame.

Figure 7:
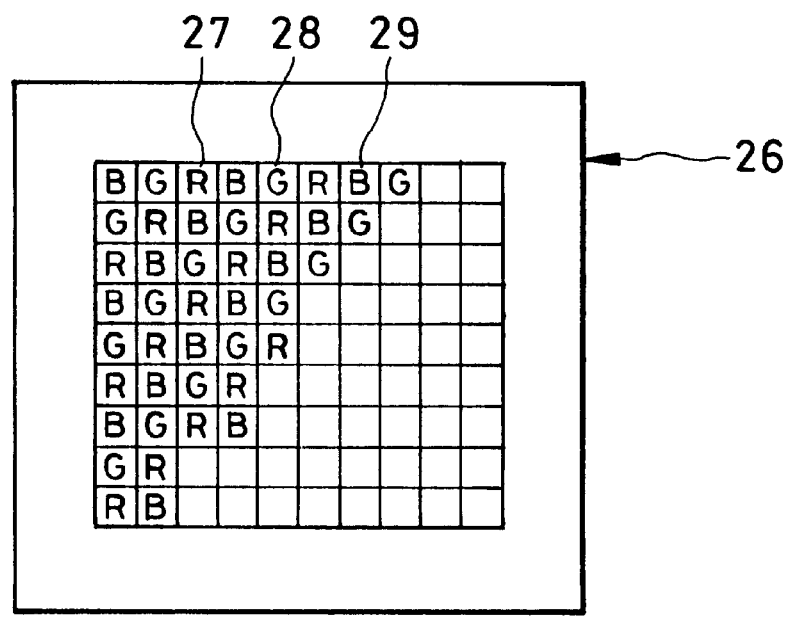
FIG. 7 is a diagram showing a color spatial light modulator having micromirrors of three primary colors disposed in a mosaic pattern.

A color spatial light modulator 26 shown in FIG. 7 has red micromirrors 27 with red filters, green micromirrors 28 with green filters, and blue micromirrors 29 with blue filters, respectively disposed in a mosaic pattern. This color spatial light modulator 20 of a mosaic pattern is used for forming an image of one frame although it has a low resolution. It is also used as a light adjuster (dimmer) of a photographic printer.

A color spatial light modulator is packaged in order to prevent dust attachment to each micromirror or breakage of the modulator because of abutment of hands or objects. This package has a window at its upper surface, the window having a transparent plate fitted therein. Instead of forming a color filter on a micromirror, a color filter may be formed on the transparent plate. It is simpler to form color filters on the transparent plate than to form them on the micromirrors, so that manufacture is easy and cost can be reduced.

Figure 8:
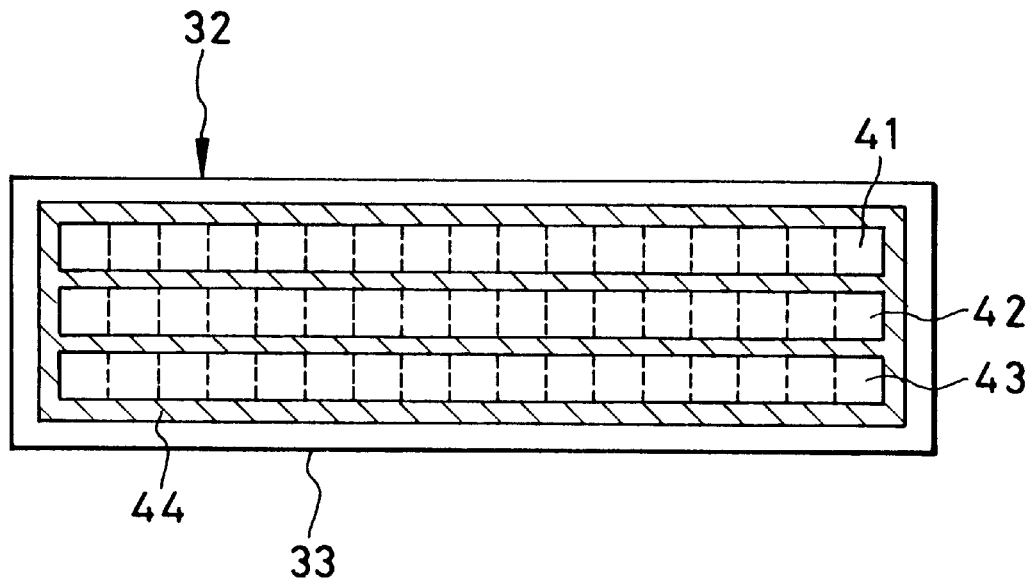
FIG. 8 is a plan view of a color spatial light modulator having a filter formed on a transparent plate of a package.
Figure 9:
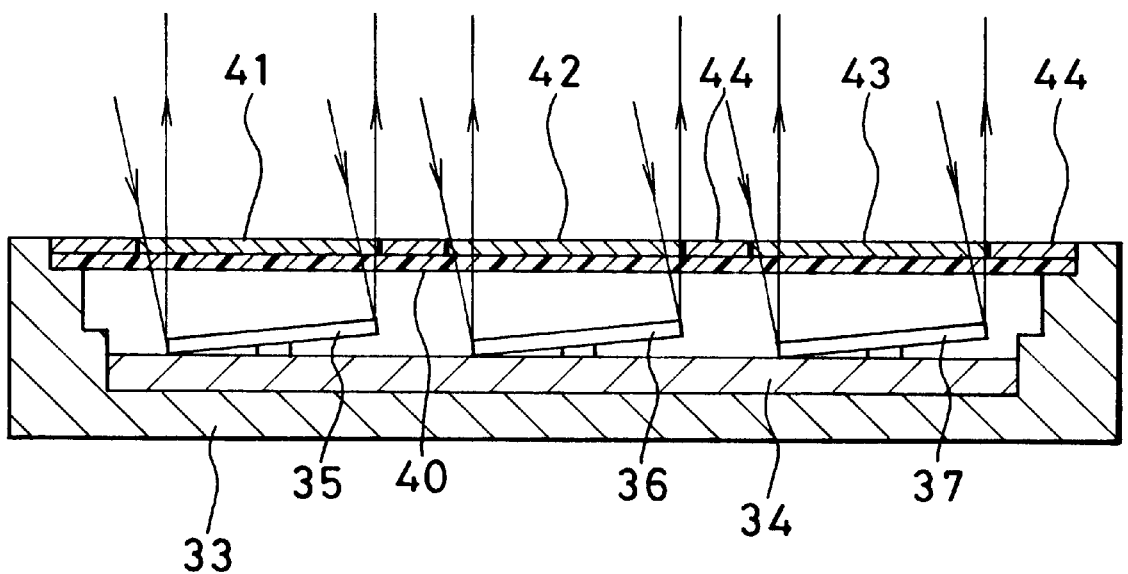
FIG. 9 is a cross sectional view of the color spatial light modulator shown in FIG. 8.

FIGS. 8 and 9 show a color spatial light modulator 32 having color filters formed on a transparent plate (cover glass). A package 33 is of a box shape with the upper portion being opened, and is made of plastic or the like. A substrate 34 formed with three micromirror arrays like those shown in FIG. 3 is housed in the package 33. FIG. 9 shows three micromirrors 35 to 37 belonging to the three micromirror arrays.

A transparent plate 40 is fixed to the package 33 at its upper opening to hermetically seal the inside of the package 33. A red filter 41, a green filter 42, and a blue filter 43 of a stripe shape are formed on the transparent plate 40, corresponding in position to the three micromirror arrays.

A mask 44 is formed on the transparent plate 40, surrounding the color filters 41 to 43. This mask 44 is formed by vapor deposition of black metal, adhesion of black sheet, or coating of black paint. This mask 44 prevents flair or the like, by shielding illumination light incident to the area other than the micromirrors and by shielding unnecessary reflection light in the package 33.

The color filters 41 to 43 and mask 44 may be formed on the transparent plate 40 on the inside thereof so that they are not stained or scratched.

The color spatial light modulator 32 shown in FIGS. 8 and 9 corresponds to the color spatial light modulator 10 shown in FIG. 3. Other color spatial light modulators corresponding to those shown in FIGS. 4 to 7 may also be manufactured.

A color spatial light modulator has an image forming function so that it can be used for a color display device such as a color video projector and a color printer. The color spatial light modulator also has a function of adjusting three color components so that it can be used for a photographic printer. Applications to a color photographic printer may be a light adjuster (dimmer) for adjusting three color components of print light in accordance with the three color densities of a negative image, and an exposure controller for controlling red, green, and blue exposure amounts of color paper in accordance with the three color densities of a negative image.

Figure 10:
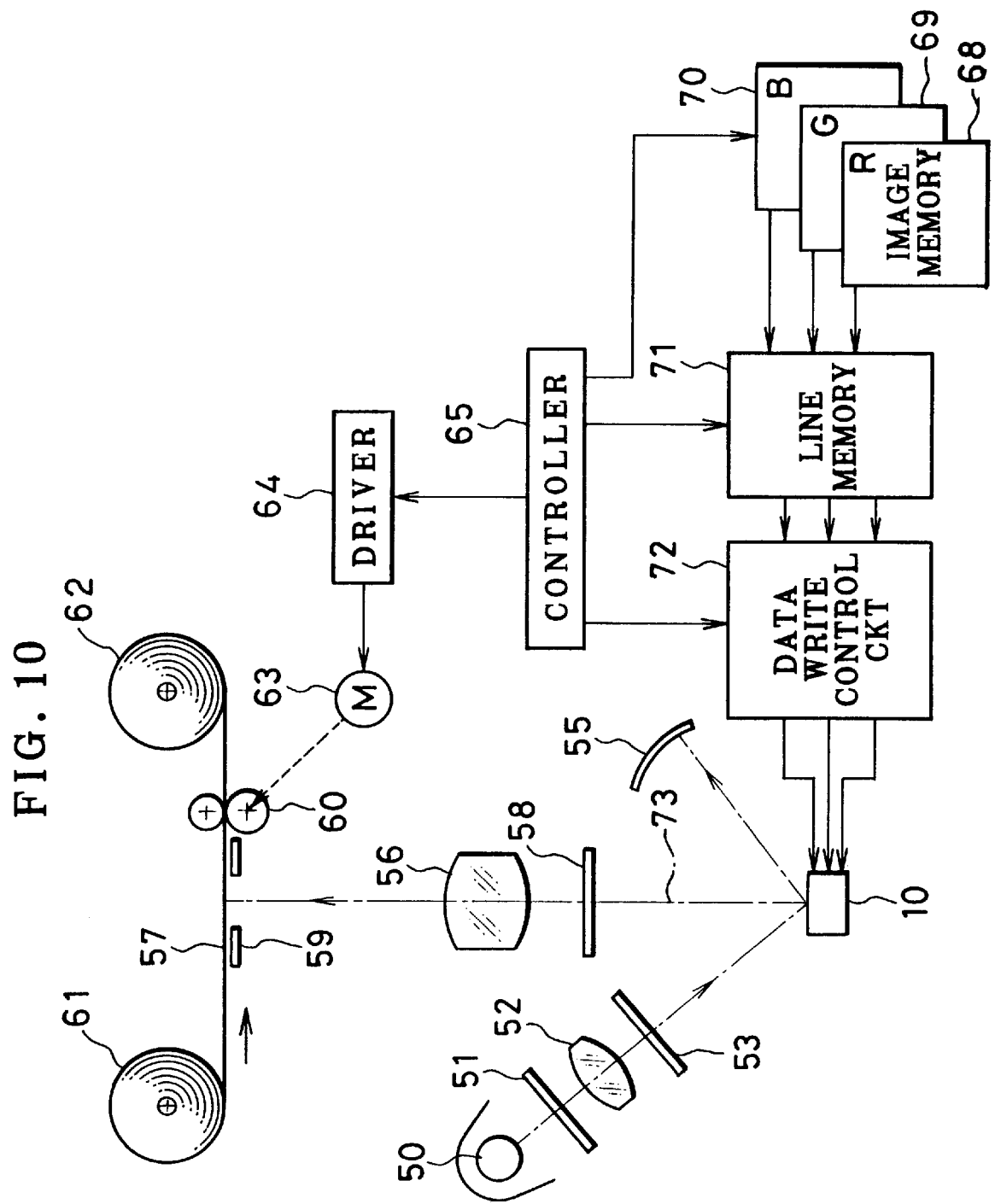
FIG. 10 is a schematic diagram of a color line printer of the invention.

FIG. 10 shows a color line printer. Infrared light contained in white light radiated from a white light source 50 is cut by an infrared light filter 51. A condenser lens 52 condenses white light toward a color spatial light modulator 10. A balance filter 53 performs shading correction so that the whole surface of the color spatial light modulator 10 is illuminated at a uniform illuminance.

Light other than specific colors in white light incident upon the color spatial light modulator 10 is absorbed by a filter. For example, in the case of a micromirror with a red filter, part of red light in white light is reflected at the surface of the red filter, and the remaining red light is transmitted through the red filter, reflected by the micromirror, and again transmitted through the red filter. In this manner, each micromirror with a red filter generates red spot light.

The color spatial light modulator 10 has three micromirror arrays 11 to 13 as shown in FIG. 3. The color spatial light modulator 10 generates red, green, and blue line light respectively constituted of red, green, and blue spot light aligned in line. Each color line light extends in the width direction of color photosensitive material such as color paper 57, and is constituted of P light spots where P is the number of micromirrors of each micromirror array 11–13.

As the micromirror tilts by +θ, it enters the valid reflection state and spot light becomes incident upon the color paper 57 via a projector lens 56 to form one pixel. As the micromirror tilts by −θ or becomes horizontal, it enters the invalid reflection state and spot light becomes incident upon a light absorption plate 55.

Red, green, and blue three light lines generated by the color spatial light modulator 10 are projected in a magnified and consecutive state onto the color paper 57 by the projector lens 56. The width of each line is M×L where M is a magnification factor of the projector lens and L is a width of the micromirror array.

Three light lines of an image whose color and density are an inversion of an image to be recorded on the color paper 57 are incident upon the color absorption plate 55. Therefore, if color photosensitive material is disposed at the position of the light absorption plate 55 and a projector lens is disposed in front of the color photosensitive material, then an image whose color and density are an inversion of an image to be recorded on the color paper 57 can be formed one line after another. Reference numeral 58 represents a balance filter, and reference numeral 59 represents a mask.

The color paper 57 is nipped with a transport roller pair 60, intermittently pulled out of a supply roll 61 by a predetermined amount (M×L), and sent to a take-up roll 62. While the color paper 57 is stopped, three parallel light lines are recorded at the same time on the color paper 57. A pulse motor 63 for rotating the transport roller pair 60 is controlled by a controller 65 via a driver 64.

Three-color image data of one frame is stored in red, green, and blue image memories 68, 69, and 70, respectively. The three-color image data is read in a one-line shift state for each color and written to a line memory 71.

Figure 11:
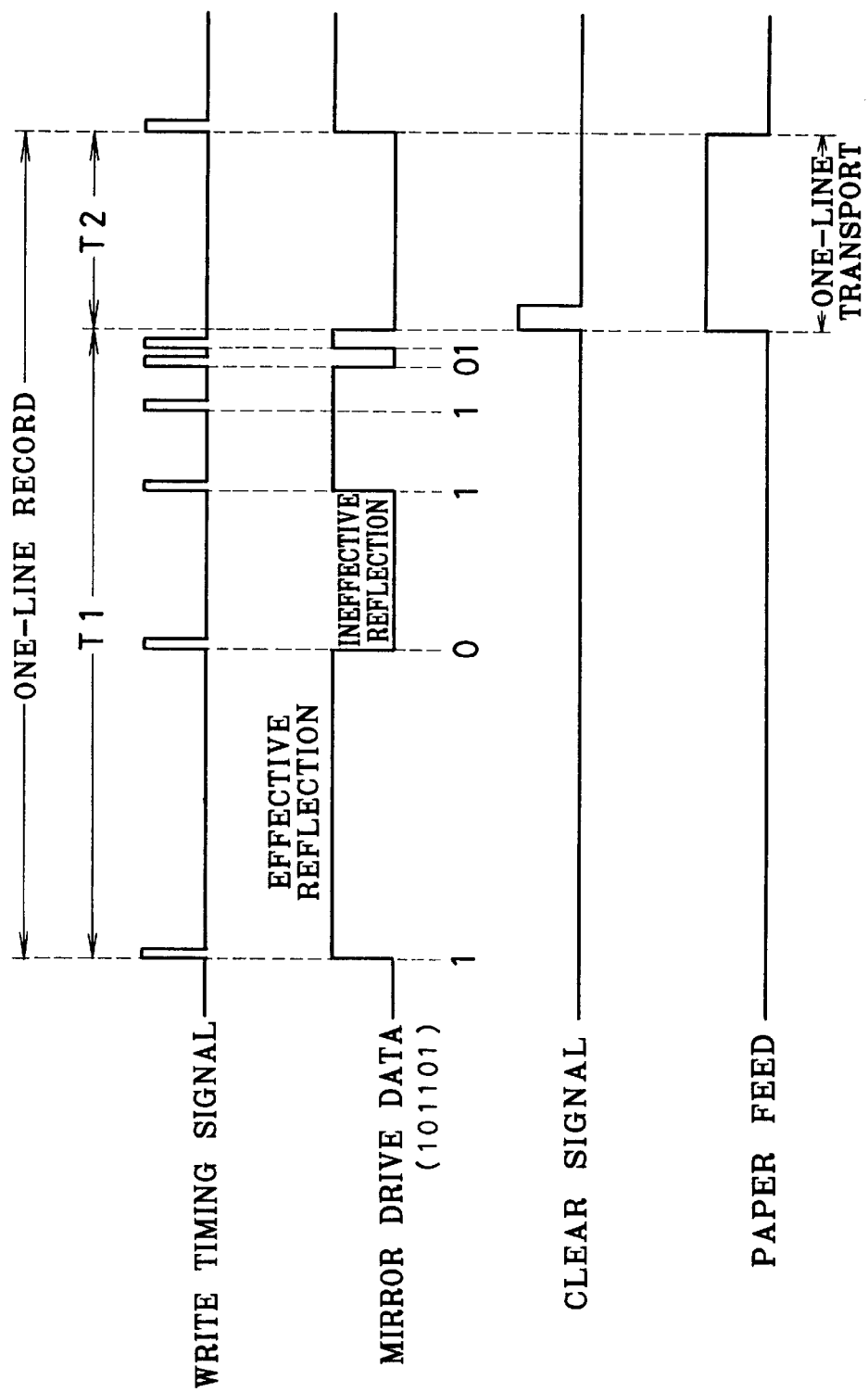
FIG. 11 shows signal waveforms illustrating a one line record operation.

As shown in FIG. 11, a data write control circuit 72 reads one line image data for each color from the line memory 71. Synchronously with a write timing signal from the controller 71, the data write control circuit 72 sequentially writes as mirror drive data one bit after another, starting from the highest bit of each image data set, into memory cells 7 of the color spatial light modulator 10. First, synchronously with the first write timing signal, the highest bits of respective image data sets are sequentially written to SRAM 4. Next, synchronously with the second write timing signal, the second highest bits of respective image data sets are written.

In this example shown in FIG. 11, image data is "101101". In this case, six bits of the image data are written as the mirror drive data to the memory cell 7 in response to six write timing signals during a time period of T1. If the mirror drive data is "1", the micromirror enters the valid reflection state and reflected spot light is projected onto the color paper 57. Since the occurrence period of write timing signals is halved sequentially, the six-bit image data is pulse-width modulated so that the total time of valid reflection states changes with a magnitude of the image data value.

After the lapse of time T1, the data write control circuit 72 writes "0s" into SRAM 4 to clear it. At the same time or immediately after SRAM 4 is cleared, one line paper transport is executed in a time period of T2. One line record cycle is completed in the time periods of T1 and T2. The color paper 57 may be transported continuously. In this case, three color lines are recorded just after the color paper 57 is transported by one line.

Next, the operation of the color line printer constructed as above will be described. Upon instruction of printing, the controller 65 instructs the data write control circuit 72 to clear the color spatial light modulator 10. The data write control circuit 72 writes mirror drive data "0" into all memory cells 7 of SRAM 4. Next, the controller 65 turns on the white light source 50 to illuminate the color spatial light modulator 10 with white light. In this case, since "0" has been written in each memory cell 7 of SRAM 4, each micromirror tilts by −θ and has the invalid reflection state. Therefore, although specific color light of illumination light radiated from the white light source 50 is allowed to travel by a filter, the light is reflected toward the light absorption plate 55.

The blue micromirror array 13 of the color spatial light modulator 10 is positioned to the left of a print optical axis 73, and the red micromirror array 11 is positioned to the right of the print optical axis 73. With this positioning, red line light of the red micromirror array 11 is projected on the color paper 57 on the upstream (left) side through the projector lens 56, and blue line light of the blue micromirror array 13 is projected on the color paper 57 on the downstream (right) side. Therefore, green on the color paper 57 is shifted downstream by one line from red, and blue is shifted downstream by two lines from red. The controller 65 operates to read red image data of the first line from the red image memory 68 and to write it to the line memory 71. Next, the controller 65 generates six write timing signals in the time period T1 at predetermined pitches and sends them to the data write control circuit 72.

Upon reception of the first write timing signal, the data write control circuit 72 writes as the mirror drive data highest bits of six-bit red image data into SRAM 4. The highest bits of one line are written to memory cells of the red micromirror array 11.

Each micromirror of the red micromirror array 11 enters the valid reflection state if the mirror drive data is "1", filters the incident white light to exit red light, reflects it as red spot light along the print optical axis 73. This red spot light is projected upon the color paper 57 by the projector lens 56. In this manner, red line light constituted of a number of red light spots disposed in line and reflected from the micromirrors in the valid reflection state, is projected onto the color paper 57. In the above manner, the first exposure is performed by the first red line light.

Upon reception of the second write timing signal, the data write control circuit 72 writes second highest bits of six-bit red image data into respective memory cells of the red micromirror array 11. With this data write, second red line light is generated from the red micromirror array 11 to complete the second exposure. In this manner, each micromirror performs exposure six times at a maximum in accordance with six-bit mirror drive data of the red image data. The lower the bit of the mirror drive data, the shorter an exposure time at each stage.

After the lapse of time T1, the data write control circuit 72 writes mirror drive data of "0" into SRAM 4 to clear it. During the time period of T2, the controller 65 operates to rotate the motor 63 to transport the color paper 57 by one line in the direction indicated by an arrow in FIG. 10.

The controller 65 operates to read the second line red image data from the red image memory 68 and the first line green image data from the green image memory 69 and to write them into the line memory 71. The image data stored in the line memory 71 is then written to SRAM 4 in response to the write timing signal as described above. The red and green micromirror arrays 11 and 12 are controlled by the image data stored in SRAM 4, and two consecutive red and green line light beams are projected on the color paper 57. The green line light is incident upon the record line where the red color is exposed previously. After six data write and exposure operations are completed in time T1, SRAM 4 is cleared and paper feed of one line is carried out.

After the paper feed, the data write control circuit 72 operates to read the third line red image data, second line green image data, and first line blue image data. These image data sets are pulse-width modulated to generate three line light beams and record parallel three lines on the color paper 57. Thereafter, similar to the above, three line light beams of red, green, and blue are made incident upon the color paper at the same time to record red, green, and blue images line sequentially.

With three-color line sequence recording, a full-color image is recorded on the color paper 57. After one frame is recorded, the color paper 57 is transported by an amount corresponding to a blank between frames. The image data of the next frame is fetched from a scanner, a TV camera, or a video reproducing apparatus, and written to the image memories 68 to 70. After this data write, three-color image data for each line is read from the image memories 68 to 70 and printed on the color paper 57.

If positive-positive type color paper is used, the color spatial light modulator 10 is driven by using image data of a positive image. If general negative-positive type color paper is used, a negative image is projected by using image data of a negative image.

FIG. 12 shows another embodiment of a data converter circuit for converting image data into mirror drive data. A single set of image data of each color is read from the line memory 71 and sent to a comparator 75. The comparator 75 compares comparison data supplied from a comparison data generator circuit 76 with each set of image data to convert the image data into mirror drive data. For example, if the comparison data is smaller than the image data, the image data is converted into mirror drive data "0", whereas if the comparison data is equal to or larger than the image data, the image data is converted into mirror drive data "1".

If the image data has six bits, the comparison data generator circuit 76 generates comparison data of "1" to "64" in decimal notation. The comparison data generator circuit 76 first generates comparison data "1" and sends it to the comparator 75. The comparator 75 sequentially fetches image data of one line one pixel after another and compares it with the comparison data "1" to convert the image data into the mirror drive data of one line.

After the first comparison of image data of one line, the comparison data generator circuit 76 generates comparison data "2". The comparator 75 compares the image data of one line with the comparison data "2". Similarly, comparison with the comparison data "3" to "64" is performed. In this manner, the six-bit image data is compared 64 times and converted into 64-bit mirror drive data.

In FIG. 13, mirror drive data of 8 bits is illustratively shown. The 8-bit mirror drive data output from the comparator 75 is sent to a shift register array 77 which is constituted of a plurality of shift registers corresponding in number to that of micromirrors. Each shift register sequentially sends one bit of the mirror drive data to the data write control circuit 78 in response to each write timing signal. In this example, the mirror drive data is "11111100" so that the micro mirror has the valid reflection state during a time period of T3. This time period T3 is an exposure time and depends upon the magnitude of an image data value so that a half tone representation matching the image data becomes possible. The write timing signals have a constant period.

A data converter circuit shown in FIG. 14 uses a LUT (look-up table). An LUT 80 stores table data representative of a relationship between each image data and corresponding mirror drive data. By using the image data as an address, mirror drive data is read from LUT 80 and set to the shift register array 77. In the example shown in FIG. 15, the mirror drive data is "1010101000" so that four exposure operations are executed for recording one pixel.

Figure 16:
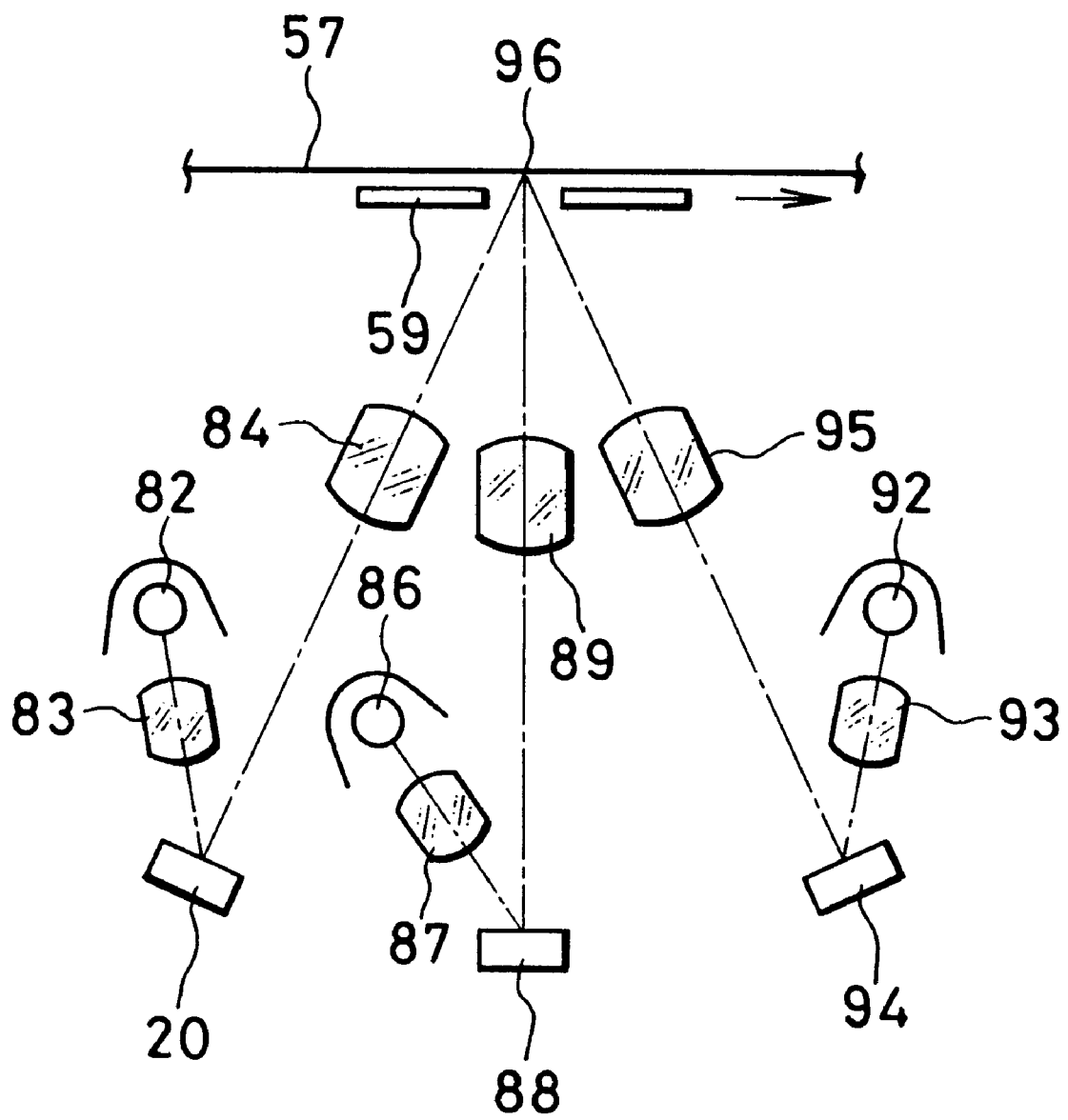
FIG. 16 is a diagram illustrating a color printer using three color spatial light modulators.

FIG. 16 shows a color line printer using three color spatial light modulators. White light from a white light source 82 illuminates via a condenser lens 83 a blue spatial light modulator 20. This blue spatial light modulator 20 has, as shown in FIG. 5, one micromirror array with a blue filter being formed on each micromirror.

Blue line light reflected from the blue spatial light modulator 20 is projected by a projector lens 84 onto a color paper 57. With a white light source 86, a condenser lens 87, a green spatial light modulator 88, and a projector lens 89, green line light is projected onto the color paper 57. This green spatial light modulator 88 has one micromirror array with a green filter being formed on each micromirror. Red line light is projected using a red spatial light modulator 94 in the same manner as above, from a white light source 92 through a condenser lens 93 and the description thereof is omitted only by giving reference numerals of these elements.

Three-color line beams are synthesized on the color paper 57 as one line beam 96 extending in the width direction of the color paper 57. In this embodiment, image data of the same line is read from three-color image memories and converted into mirror drive data to drive the three color spatial light modulators 20, 88, and 94. After one line recording, the color paper 57 is transported by one line.

Since the optical paths of the projector lens 84 and a projector lens 95 are inclined relative to the color paper 57, surface exposure is affected and color misalignment may occur, although line exposure is not so much affected. This problem can be solved by using the following optical system. On an optical path vertical to the color paper 57, i.e., on an input optical path of the projector lens 89, two dichroic mirrors or half mirrors are disposed being inclined by 45 degrees. Line light beams from the blue and red spatial light modulators 20 and 94 may be made incident upon the two mirrors. After three line light beams are synthesized, they are input to the projector lens 89. In this case, the projector lenses 84 and 95 are not necessary.

Instead of the line type blue spatial light modulator 20, the area type blue spatial light modulator 24 shown in FIG. 6 may be used. In this case, area type green and red spatial light modulators may be used in place of the line type green and red spatial light modulators 88 and 94. Since each area type color spatial light modulator forms an image of one frame, frame exposure is possible. On the color paper, three color images of one frame are printed at the same time.

Figure 17:
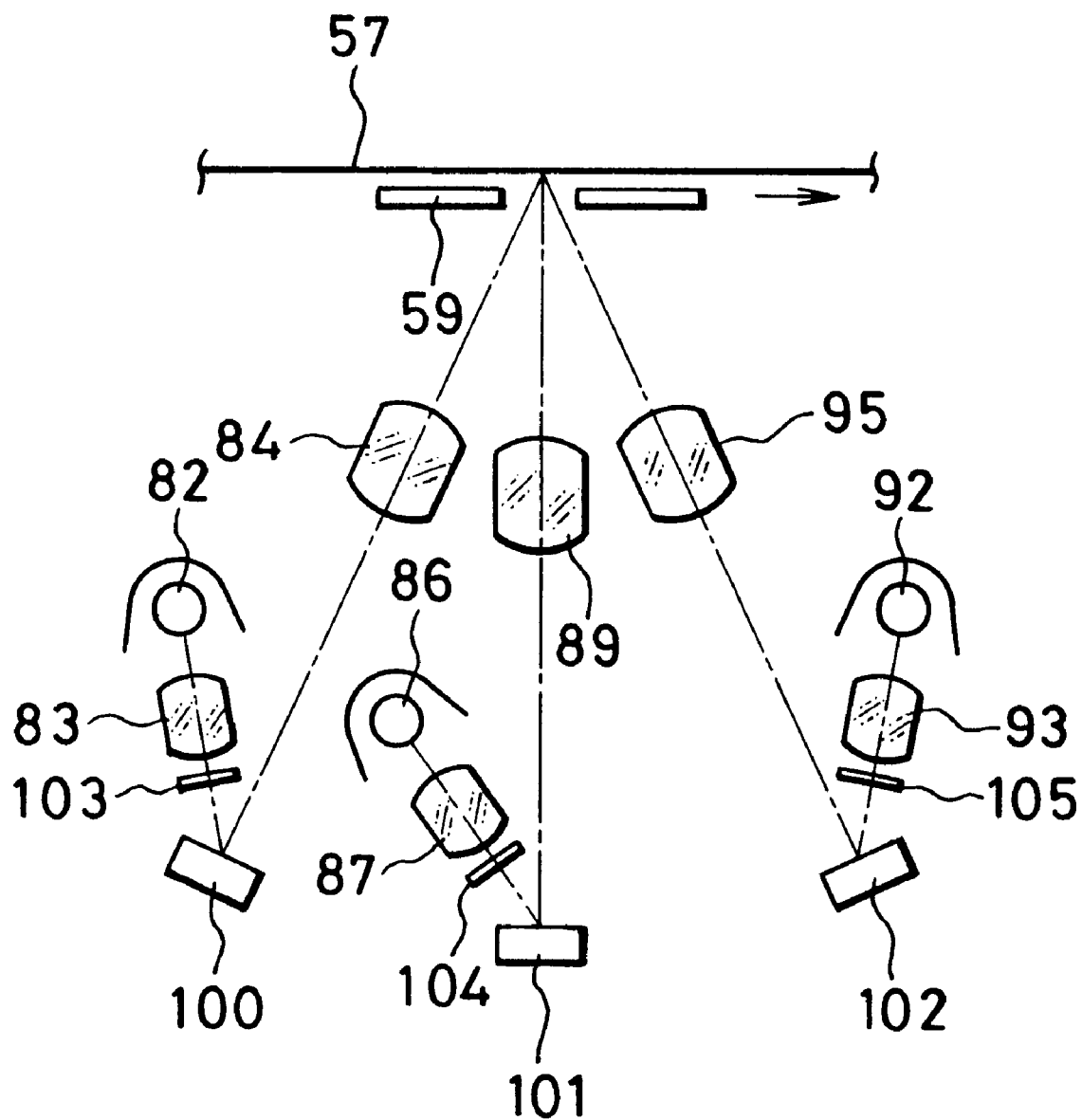
FIG. 17 is a diagram illustrating a color line printer with color filters inserted in optical paths.

Instead of directly forming a filter on each micromirror, a filter may be disposed on the input optical path of the micromirror or on the output optical path thereof. FIG. 17 shows an embodiment of a color printer in which filters are disposed on the input optical path of the color spatial light modulators. In FIG. 17, like elements to those shown in FIG. 16 are represented by using identical reference numerals. Blue, green, and red digital micromirror devices 100 to 102 are provided. Each of these digital micromirror devices 100 to 102 is provided with one line micromirror array. Each of these digital micromirror devices 100 to 102 may obviously be provided with a plurality of micromirror arrays or a number of micromirror arrays prepared for surface exposure.

Each micromirror array is not formed with filters. Instead, a blue filter 103 for allowing only blue light to travel upon receipt of white light is disposed on the input optical path of the blue digital micromirror device 100, a green filter 104 is disposed on the input optical path of the green digital micromirror device 101, and a red filter 105 is disposed on the input optical path of the red digital micromirror device 102.

Red, green, and blue line light beams reflected from the three digital micromirror devices 100 to 102 and extending in the width direction of the color paper 57 are made incident upon the color paper 57 at the same position and synthesized.

In the above embodiment, although three digital micromirror devices 100 to 102 are used, one digital micromirror device having three micromirror arrays may be used. In this case, three-color filters of a strip shape are disposed in front of the color paper 57.

Instead of a combination of white light sources and filters, it is possible to use blue, green, and red light sources for radiating blue, green, and red light. In this case, filters are not necessary so that the structure is simplified. Such color light sources may use LED light sources.

Figure 18:
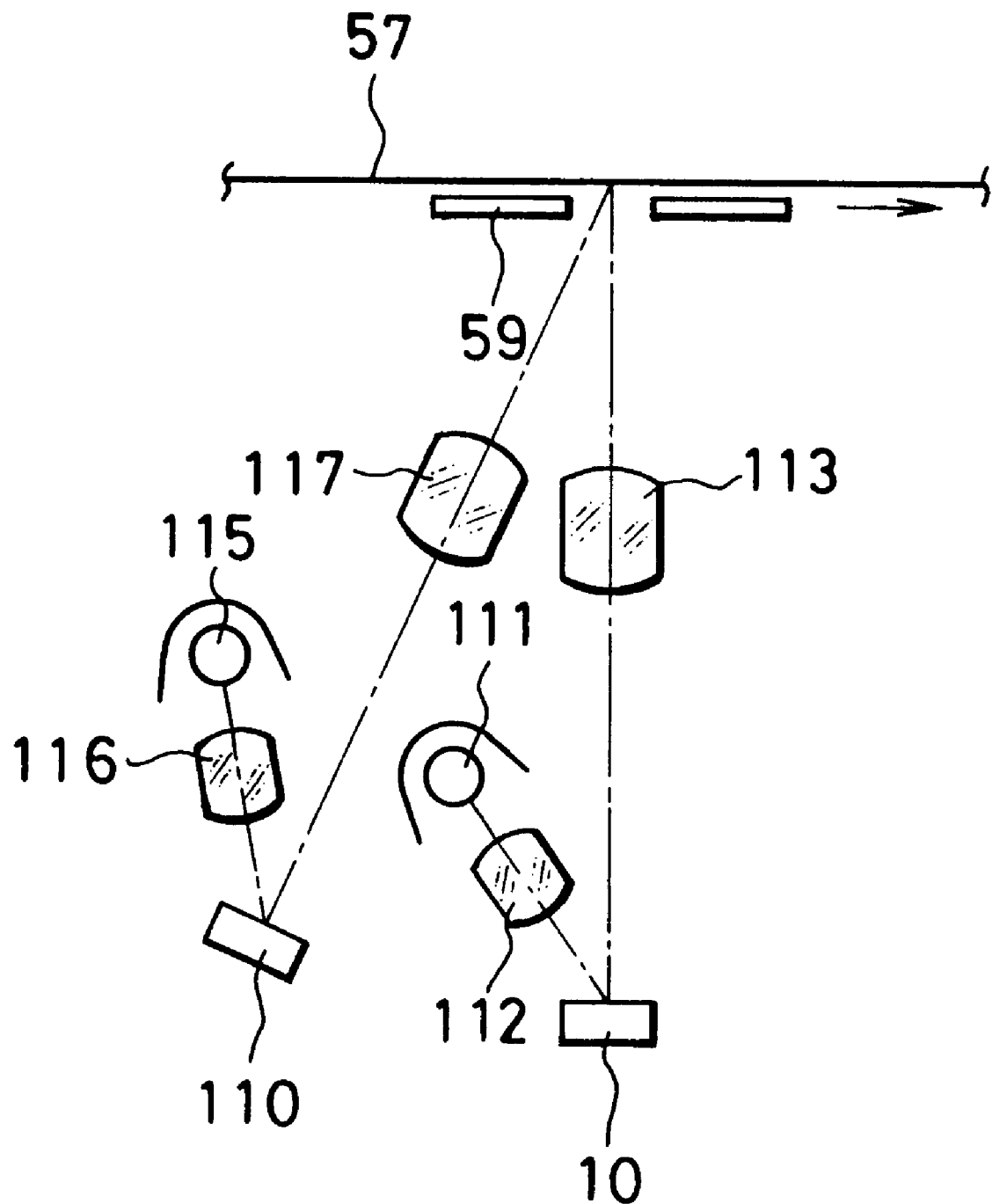
FIG. 18 is a diagram illustrating a color line printer capable of recording both a color image and a monochrome image.

Monochrome characters indicating compliments, a notice, an address, or the like on a postcard are often printed together with a color image. FIG. 18 shows a color printer in which a color image recording unit and a monochrome image recording unit are provided. The color image recording unit is constituted of a white light source 111, the condenser lens 112, a color spatial light modulator 10, and a projector lens 113. The monochrome image recording unit is constituted of a white light source 115, a condenser lens 116, a digital micromirror device 110, and a projector lens 117.

The color spatial light modulator 10 has, as shown in FIG. 3, three micromirror arrays having micromirrors formed with filters, and generate red, green, blue line light beams. The digital micromirror device 110 has three micromirror arrays having micromirrors without filters, and generates three white line light beams. With the white line light beams, characters and line drawing can be recorded on a color paper 57. A color image and a monochrome image can be recorded at the same time or selectively recorded. A digital micromirror device may be used with the color printer shown in FIGS. 10, 16, and 17.

A color printer may directly print image data fetched from a scanner, a video reproducing apparatus, or the like, or may print it after image processing. For example, sequentially input images may be printed one at a time, or image data may be thinned to form a synthesized image of reduced images disposed in matrix which is then printed on color paper as an index sheet. The same image data may be input to two color printers to form an image one at a time by one color printer and to form an index sheet through image synthesis by the other color printer.

A color printer of this invention may be combined with a conventional photographic printer which projects an image of a photographic film onto color paper to print it. For example, an integrated assembly of a conventional photographic printer as a first printer and a color printer of this invention as a second printer may be used. The color printer and photographic printer may be used in combination in operations.

With an integrated assembly, two printers may use the same exposure stage or different exposure stages. Two printers may use the same photosensitive material or different photosensitive materials. If the same exposure stage is used and the two printers use different photosensitive materials, the photosensitive materials accommodated in two magazines are selectively fed to the exposure stage. In this case, components other than the paper feeder can be used in common so that the apparatus can be made compact.

If the same exposure stage is used, a photographic image of the first printer and a character or illustration image by the second printer may be printed superposed one upon the other in the same frame to thereby form, for example, a postcard. The first printer may be provided with a scanner which reads each frame of a photographic print to form an index image. After one roll of photographic film is printed, the index sheet may be formed by the second printer. In this case, a print of a photographic film and an index sheet may be formed by using the same photosensitive material or different photosensitive materials.

If the different exposure stages are used, different images may be printed in the same frame at the upstream and downstream positions to thereby form, e.g, a postcard. If images are printed in different frames of the same photosensitive material, the first printer may be provided with a scanner. In this case, if the image can be printed without any correction, the first printer prints it. For a frame which requires image processing such as dodging (shutting light method), the second printer prints it.

If both the exposure stage and photosensitive material are different, the first printer prints a photographic film and each frame thereof is read with a scanner to form an index image which is printed by the second printer using the different photosensitive material.

A color printer of this invention and a photographic printer may be used discretely. In this case, the photographic printer exposes and prints an image of a photographic film, a scanner reads each frame of the photographic film, and the obtained video signals are sent to the color printer of this invention to form an index print.

Instead of red, green, and blue filters, yellow, magenta, and cyan filters may be formed for each micromirror. In a plurality of micromirror arrays disposed in parallel, the vertical and horizontal positions of respective micromirrors are aligned. The micromirrors may be disposed in a zigzag pattern by laterally shifting the micromirrors of adjacent two micromirror arrays by a half the pitch of micromirrors.

As mirror type color spatial light modulators, a piezoelectric drive type micromirror device, in which each micromirror is displaced by a fine piezoelectric element, may be used in addition to a digital micromirror device. The color spatial light modulator of this invention may be used for a color projector, a color display, and the like, in addition to a color printer.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A color spatial light modulator which forms an image on a photosensitive material, comprising:
    at least one micromirror array having a plurality of micromirrors;
    means for tilting said micromirrors at an angle from horizontal to achieve an image forming optical path; and
    filter means fixedly disposed on each of said micromirrors for at least one of transmitting and absorbing light of specific wavelengths such that image forming light is transmitted along said image forming optical path to form said image on said photosensitive material.

2. A color spatial light modulator according to claim 1, wherein said at least one micromirror array includes first to third micromirror arrays disposed in parallel.

3. A color spatial light modulator according to claim 2, wherein said filter means includes red, green, and blue color filters, said red filter is formed on each micromirror of said first micromirror array, said green filter is formed on each micromirror of said second micromirror array, and said blue filter is formed on each micromirror of said third micromirror array.

4. A color spatial light modulator according to claim 1, wherein said at least one micromirror array includes N (N is an optional natural number) micromirror arrays, said N micromirror arrays being disposed in parallel, the micromirrors being thereby disposed in matrix.

5. A color spatial light modulator according to claim 4, wherein said filter means includes red, green, and blue filters formed on the micromirrors in a mosaic pattern.

6. A color spatial light modulator which forms an image on a photosensitive material, comprising:
    at least one micromirror array having a plurality of micromirrors;
    means for tilting said micromirrors at an angle from horizontal to achieve an image forming optical path;
    a package for accommodating said at least one micromirror array, said package being of a box shape having an opening in the upper portion thereof;
    a transparent plate for closing the opening of said package; and
    filter means fixedly disposed on said transparent plate in correspondence with each micromirror for at least one of transmitting and absorbing light of specific wavelengths such that image forming light is transmitted along said image forming optical path to form said image on said photosensitive material.

7. A color spatial light modulator according to claim 6, wherein said at least one micromirror array includes first to third micromirror arrays disposed in parallel.

8. A color spatial light modulator according to claim 7 wherein said filter means includes red, green, and blue color filters, said red filter is associated with said first micromirror array, said green filter is associated with said second micromirror array, and said blue filter is associated with said third micromirror array.

9. A color spatial light modulator according to claim 6, wherein said at least one micromirror array includes N (N is an optional natural number) micromirror arrays, said N micromirror arrays being disposed in parallel, the micromirrors being thereby disposed in matrix.

10. A color spatial light modulator according to claim 9, wherein said filter means includes red, green, and blue filters disposed in a mosaic pattern.

11. A color printer for printing a color image on a photosensitive material, comprising:
    color spatial light modulator means for spatially modulating light comprising at least one red micromirror array, at least one green micromirror array, and at least one blue micromirror array, said red micromirror array having a plurality of micromirrors disposed in line and fixedly formed with a red filter, said green micromirror array having a plurality of micromirrors disposed in line and fixedly formed with a green filter, and said blue micromirror array having a plurality of micromirrors disposed in line and fixedly formed with a blue filter;
    means for tilting said micromirrors at an angle from horizontal to achieve an image forming optical path;
    means for driving said spatial light modulator means in accordance with red, blue, and green image data of one line to control a tilt of each micromirror;
    a white light source for illuminating said spatial light modulator means with white light; and
    a projector optical system for projecting three-color line light beams reflected from said micromirror arrays along said image forming optical path to form said image on the photosensitive material.

12. A color printer according to claim 11, wherein said color spatial light modulator means includes N (N is an optional natural number) red micromirror arrays, N green micromirror arrays, and N blue micromirror arrays, respectively disposed in parallel.

13. A color printer according to claim 11, wherein said color spatial light modulator means includes a red spatial light modulator, a green spatial light modulator, and a blue spatial light modulator, said red spatial light modulator includes N (N is an optional natural number) red micromirror arrays whose micromirrors are disposed in matrix, said green spatial light modulator includes N green micromirror arrays whose micromirrors are disposed in matrix, and said blue spatial light modulator includes N blue micromirror arrays whose micromirrors are disposed in matrix.

14. A color printer according to claim 11, further comprising at least one micromirror array having a plurality of micromirrors disposed in line each capable of being controlled to tilt in accordance with image data, said micromirror array recording a monochrome image onto the photosensitive material.

15. A color spatial light modulator which forms an image on a photosensitive material, comprising:
    at least one micromirror array having a plurality of micromirrors;
    a tilt mechanism which tilts said micromirrors at an angle from horizontal to achieve an image forming optical path; and
    a filter fixedly disposed on each of said micromirrors for at least one of transmitting and absorbing light of specific wavelengths such that image forming light is transmitted along said image forming optical path to form said image on said photosensitive material.

16. A color spatial light modulator which forms an image on a photosensitive material, comprising:
    at least one micromirror array having a plurality of micromirrors;
    a tilt mechanism which tilts said micromirrors at an angle from horizontal to achieve an image forming optical path;

a package for accommodating said at least one micromirror array, said package being of a box shape having an opening in the upper portion thereof;

a transparent plate for closing the opening of said package; and a filter fixedly disposed on said transparent plate in correspondence with each micromirror for at least one of transmitting and absorbing light of specific wavelengths such that image forming light is transmitted along said image forming optical path to form said image on said photosensitive material.

17. A color printer for printing a color image on a photosensitive material, comprising:

a color spatial light modulator comprising at least one red micromirror array, at least one green micromirror array, and at least one blue micromirror array, said red micromirror array having a plurality of micromirrors disposed in line and fixedly formed with a red filter, said green micromirror array having a plurality of micromirrors disposed in line and fixedly formed with a green filter, and said blue micromirror array having a plurality of micromirrors disposed in line and fixedly formed with a blue filter;

a tilt mechanism which tilts said micromirrors at an angle from horizontal to achieve an image forming optical path;

a driver for driving said color spatial light modulator in accordance with red, blue, and green image data of one line to control a tilt of each micromirror;

a white light source for illuminating said color spatial light modulator with white light; and a projector optical system for projecting three-color line light beams reflected from said micromirror arrays along said image forming optical path to form said image on the photosensitive material.

* * * * *